United States Patent [19]
Dorsey

[11] 3,784,870
[45] Jan. 8, 1974

[54] PROTECTION CIRCUIT

[75] Inventor: Denis Peter Dorsey, Levittown, Pa.
[73] Assignee: RCA Corporation, New York, N.Y.

[22] Filed: Aug. 7, 1972
[21] Appl. No.: 278,280

[30] Foreign Application Priority Data
Apr. 24, 1972 Great Britain .................. 19,017/72

[52] U.S. Cl. .............................. 315/20, 315/27 TD
[51] Int. Cl. .............................................. H01j 29/70
[58] Field of Search .......................... 315/20, 27 TD

[56] References Cited

UNITED STATES PATENTS

| | | | |
|---|---|---|---|
| 3,134,928 | 5/1964 | Freedman | 315/27 TD |
| 3,437,872 | 4/1969 | Henderson et al. | 315/20 |
| 3,588,608 | 6/1971 | Halinski et al. | 315/20 X |
| 3,600,630 | 8/1971 | Strachanow | 315/27 TD |

*Primary Examiner*—Carl D. Quarforth
*Assistant Examiner*—P. A. Nelson
*Attorney*—Eugene M. Whitacre et al.

[57] ABSTRACT

The circuit of the invention operates in conjunction with an imaging transducer to sense the loss of applied horizontal or vertical deflection signals, and to respond to such loss by changing the bias voltage on the transducer in a direction to turn "off" its electron beam.

6 Claims, 2 Drawing Figures

PROTECTION CIRCUIT

FIELD OF THE INVENTION

This invention relates to image transducer systems, and, more particularly, to a circuit for protecting such transducers against permanent damage to the face or target thereof in the event of a failure in the horizontal or vertical deflection circuits of the system. Such protection circuit is suitable for use both with vidicon camera tube pick-up systems and with cathode-ray tube reproducing systems—and is especially attractive in communications systems of the type which employ a storage tube, either for the selection of a frame of television information to be transmitted to a remote receiver location by means of an audio channel (e.g., a voice grade telephone line) or in the recording and recreation of such television information when received along the communications link.

SUMMARY OF THE INVENTION

As will become clear hereinafter, the circuit of the present invention responds to a loss of applied horizontal or vertical deflection signals to cut-off the beam of the image transducer to thereby limit electron burning. A three-input logic circuit is employed: a first direct current voltage representative of the presence or absence of horizontal deflection signals is supplied to one input, a second direct current voltage representative of the presence or absence of vertical deflection signals is supplied to another input, and mixed horizontal and vertical blanking signals for the electron beam are supplied to the third input. In normal operation, the first two direct voltage levels are such that only the mixed signals couple through the logic circuit to control the blanking of the electron beam in transducer operation. If a failure occurs either in the horizontal or vertical deflection circuits, on the other hand, the change in direct voltage level input which occurs causes the logic circuit to become disabled and result in such change in bias on the imaging transducer as to render it nonconductive and hold the beam "blanked off" until corrective repairs are made.

Two arrangements to sense the presence or absence of vertical deflection signals are described. One arrangement is designed for use with a storage tube type imaging transducer which is used to select a particular frame of television screen information. The other arrangemement is designed for use with a similar storage tube transducer, but applied to an audio communications channel, to transmit and re-create the information between two remote locations. A communications system of this nature is described in pending U.S. patent application Ser. No. 257,412, filed May 26, 1972, and entitled "TELEPHONE IMAGE TRANSMISSION SYSTEM". As is therein described, the vertical deflection rate at the storage tube of the receiving location is either one-eighth or one-sixteenth the normal 60 Hz viewing rate in order to reproduce successively transmitted picture elements adjacent one-another in the resulting display.

BRIEF DESCRIPTION OF THE DRAWINGS

These and other features of the present invention will be more clearly understood from a consideration of the following description taken in connection with the accompanying drawings in which.

DETAILED DESCRIPTION OF THE DRAWINGS

Figure 1:
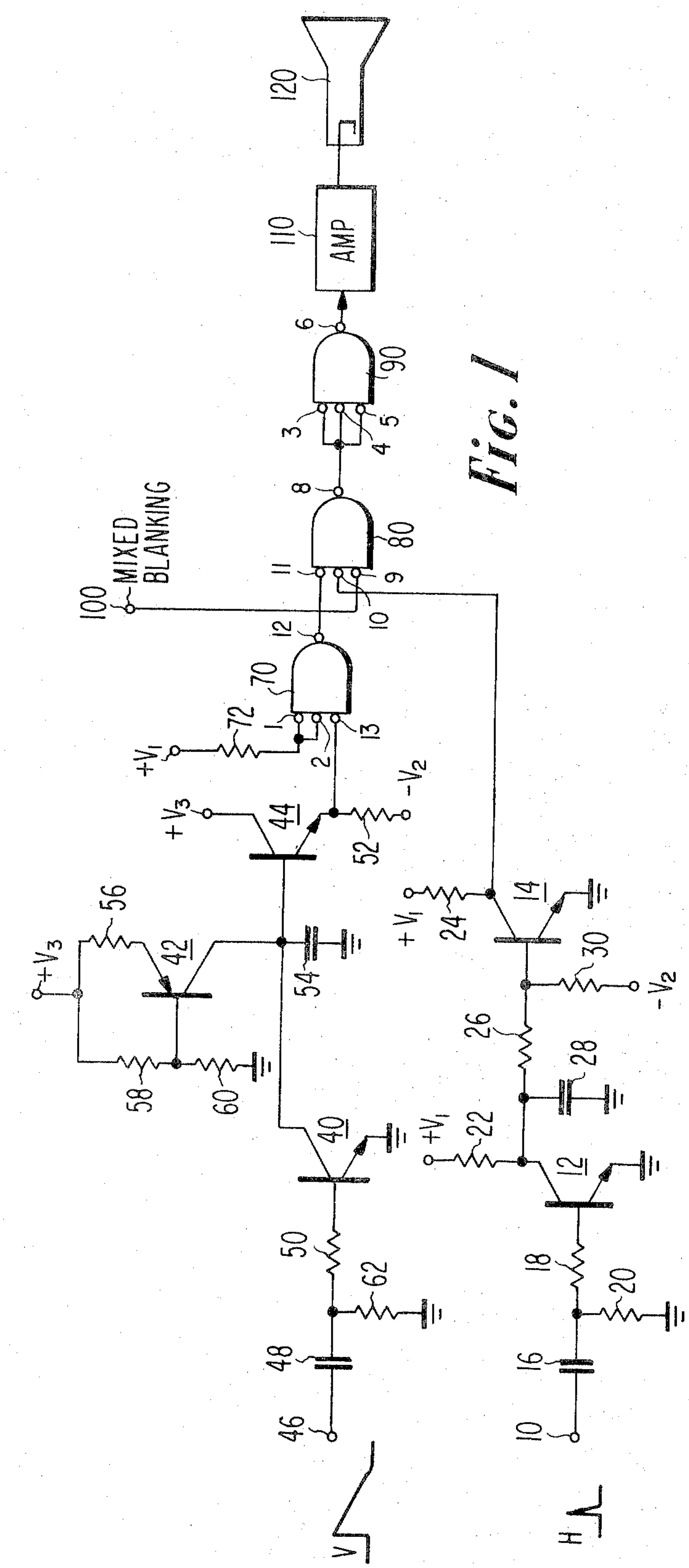
FIG. 1 shows a protection circuit for imaging transducers constructed in accordance with the present invention.

That portion of the configuration of FIG. 1 which provides protection of the image transducer in the absence of horizontal deflection signals first of all includes a pair of transistors 12 and 14. The base electrode of transistor 12 is coupled by a capacitor 16 and a resistor 18 to an input terminal 10, to which horizontal flyback pulses are applied, while the junction between the components 16, 18 is coupled by a resistor 20 to a point of reference or ground potential. A further resistor 22 couples the collector electrode of transistor 12 to a source of operating potential $+V_1$, while a similar such resistor 24 couples the collector electrode of transistor 14 to that same potential source. The collector electrode of transistor 12 is further coupled, first by a resistor 26 to the base electrode of transistor 14 and second, by a capacitor 28 to ground. The emitter electrodes of both transistor 12 and 14 are grounded, and a resistor 30 completes the configuration by coupling a second source of potential $-V_2$ to the base electrode of transistor 14.

That portion of the FIG. 1 configuration which provides protection against vertical deflection signal failures, on the other hand, includes three transistors 40, 42, and 44. Vertical deflection signals are applied at an input terminal 46, and are coupled by means of a capacitor 48 and a resistor 50 to the base electrode of transistor 40, its emitter electrode being connected to ground. The collector electrode of transistor 40 is, in turn, connected to the base electrode of transistor 44, the collector electrode of which is energized from a third source of operation potential $+V_3$ while its emitter electrode is coupled by a resistor 52 to the second potential source $-V_2$. Also coupled to the base electrode of transistor 44 is the collector electrode of transistor 42 and one terminal of a capacitor 54, the other terminal of which is grounded. A resistor 56 couples the emitter electrode of transistor 42 to the $+V_3$ source of potential, while resistors 58 and 60 form a voltage divider for the base electrode of transistor 42, their junction being directly connected to that electrode and their series connection being coupled between the $+V_3$ source and ground. Lastly, a resistor 62 is included to couple the junction between capacitor 48 and resistor 50 to ground.

Also shown in the configuration of FIG. 1 are an inverter circuit 70, a three-input NAND circuit 80 and a second inverter circuit 90. Such circuits may comprise portions of a single integrated circuit device of the type manufactured by the Signetics Corporation of Sunnyvale, California, and available under its identification number 7410. As will be seen from the schematic representation of the drawing, the functions of circuits 70, 80 and 90 may be attained by interconnecting the various terminals of the integrated chip in the manners indicated. Thus, by connecting each of terminals 3, 4 and 5 of the 7410 chip to its terminal 8, an output of zero volts direct current will be developed at its terminal 6 when the input signal at terminal 8 goes positive. Terminals 9, 10 and 11 of the integrated device are respectively connected to a source 100 supplying standard, mixed horizontal and vertical blanking signals, to the collector electrode of transistor 14 and to its chip terminal 12, such that a direct current voltage, positive with respect to ground, will be provided at terminal 8 of the integrated circuit, only when one or more of the terminals 9, 10 and 11 are at a zero volt level. Terminals 1 and 2 of the chip, on the other hand, are each coupled by a common resistor 72 to the $+V_1$ potential source, while its terminal 13 is connected to the emitter electrode of transistor 44—such latter arrangement provides a zero volt direct current voltage at terminal 12 of the integrated device when its terminal 13 is at a positive level and provides a positive direct current voltage at terminal 12 when terminal 13 is in turn driven to ground.

The configuration of the drawing finally includes an amplifier 110 through which the output signal at terminal 6 of this 7410 integrated circuit device is coupled to the cathode electrode of the vidicon pick-up tube, cathode ray reproducing tube, storage tube, etc. As will become clear below, in the absence of either applied horizontal or vertical deflection signals, the output signal developed at terminal 6 is a substantially zero volt direct current level, which causes the amplifier 110 to drive the cathode electrode of the imaging transducer 120 to that level at which the beam thereof will be driven to cutoff.

In operation—and considering first the absence of any horizontal flyback signal to input terminal 10—, it will be seen that transistor 12 will be held in a nonconductive condition to prevent the discharge of any voltage stored on capacitor 28 as it charges to the $+V_1$ potential through resistor 22. The component values selected for capacitor 28 and resistor 22 are such that the bias voltage applied to the base electrode of transistor 14 during the capacitor charge cycle will go sufficiently positive within 100 microseconds or so to render transistor 14 conductive. The collector electrode voltage of transistor 14 will then be reduced from its $+V_1$ voltage when nonconducting to essentially zero volts when conductive. Application of this zero volt level to terminal 10 of NAND circuit 80 causes terminal 8 of the device to be driven positive (as defined above), thereby causing the voltage developed at terminal 6 to go to zero volts. With terminal 6 at this voltage level, amplifier 110 automatically biases the cathode electrode of imaging transducer 120 to the level that will cut-off the electron beam of the device employed. A 100 microsecond time constant is selected for resistor 22 and capacitor 28 to insure the passage of sufficient time within which to check the application of horizontal flyback pulses to input terminal 10.

If horizontal pulses appear at terminal 10 during this interval, on the other hand, transistor 12 will be rendered conductive by their positive going excursions. The voltage stored on capacitor 28 will then be discharged to ground, before reaching that level which will drive transistor 14 to conduction. The collector electrode voltage of this transistor will thus be at the $+V_1$ potential and, by itself, will be insufficient to drive chip terminal 8 to that direct current voltage which will cause the electron beam of transducer 120 to "cutoff".

Considering, next, the absence of vertical deflection signals applied to terminal 46, it will first be appreciated that transistor 42 constitutes a current generator which charges capacitor 54 with a substantially constant current. In normal operation, the vertical deflection signals which appear at input terminal 46 at the beginning of every vertical sweep drive transistor 40 to conduction and discharge this capacitor before a sufficiently positive voltage is applied to the base electrode of transistor 44. The emitter electrode of transistor 44 and chip terminal 13 will not then reach a positive potential to reduce terminal 12 to a zero volt output level. When such is the case, a positive direct voltage will be developed at terminal 12, so as to permit NAND circuit 80 to develop a zero volt potential at its output terminal 8. However, if the vertical signal applied to terminal 46 fails, transistor 40 remains nonconductive to permit the voltage stored on capacitor 54 to rise to that level at which transistor 44's emitter terminal drives the chip terminal 13 to a positive voltage. As previously noted, such positive voltage places a zero volt level at terminal 12, activates NAND circuit 80, causes a zero volt potential to be developed at terminal 6, and causes the cathode electrode potential of the transducer 120 to rise to cut-off its electron beam.

Transistor 42 is constructed as a constant current source in this manner so that capacitor 54 will charge linearly and at a relatively slow rate compared to the vertical deflection rate of signals applied to the terminal 46. Whenever the leading edge of the input vertical sawtooth signal is applied to render transistor 40 conducting, the capacitor 54 will discharge before it has stored sufficient energy to turn transistor 44 conductive.

One further feature of this vertical protection circuitry resides in the selection of a time constant for capacitor 48 and resistor 62. More particularly, the time constant is selected so that if the vertical sweep signal amplitude applied at terminal 46 is less than half its normal amplitude, the transducer beam will also be "blanked-off". With this time constant, transistor 40 will not be driven to conduction by such low sweep amplitudes, and capacitor 54 will once again charge to the required positive voltage to activate transistor 44, without being discharged through transistor 40. This protective feature serves to inhibit any permanent burning of target area when less than half of its surface is vertically scanned.

Figure 2:
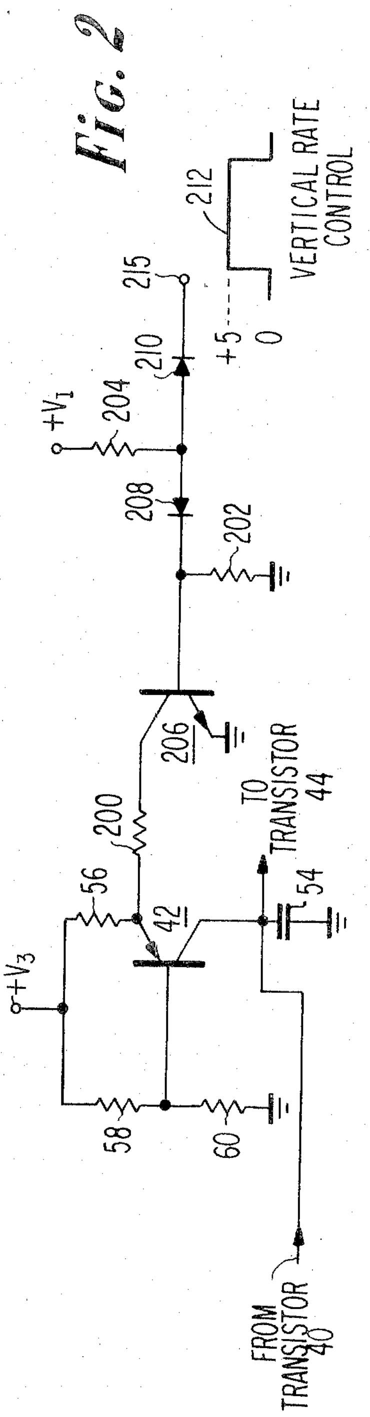
FIG. 2 is a modification of that part of the protection circuit of FIG. 1 which relates to the loss of slow-rate vertical deflection signals.

The configuration of FIG. 2 shows an additional arrangement for the vertical protection circuitry when a storage tube type of transducer device, for example, is to be operated in its slow-scan mode for recreation of television information signals transmitted to it along an audio communications link. As described in pending application Ser. No. 257,412, the storage device when utilized in this mode—as contrasted to its use in selecting a frame of video information for transmission—is operated at a somewhat reduced vertical rate. To provide for protection in the absence of vertical signals in this mode, it will be readily apparent that the time in which capacitor 54 senses the absence of these signals must be increased to then check the loss of signals which, in that mode of operation, occur at approximately a 60/16-cycle rate or 60/8-cycle rate. To this end, three resistors 200, 202 and 204, a further transistor 206 and a pair of rectifiers 208, 210 are included for use with the FIG. 1 arrangement, as shown in FIG. 2. To be more specific, resistor 200 couples the emitter electrode of transistor 42 to the collector electrode of transistor 206, the emitter electrode of which is grounded. The base electrode of transistor 206 is coupled, on the one hand, via resistor 202 to ground and, on the other hand, via the rectifier 208 to one terminal of resistor 204. Also coupled to that terminal of resistor 204 is the second rectifier 210, with both rectifiers 208 and 210 having their anode electrodes in common connection with that resistor. Lastly, resistor 204 is shown being returned to the $+V_1$ potential source while the cathode electrode of rectifier 210 is coupled to an input terminal 215, to which control signals of the type illustrated by the positive pulse waveform 212 are applied.

During the 60-cycle per second rate of operation—when the storage tube transducer is used to select a frame of television information for transmission to a remote receiver location by an audio communications channel—the voltage level applied to terminal 215 will be zero volts with the waveform shown, to cause transistor 206 to be held nonconductive. In such case, the current which flows from the $+V_3$ source through resistor 56 and transistor 42 serves to charge the capacitor 54 to that level which would cause transistor 44 to conduct in the absence of vertical rate signals. When the apparatus is switched to its slow-scan mode of operation, on the other hand, the positive voltage level which then appears at terminal 215 is sufficient to reverse-bias rectifier 210 and cause the resulting potential at the base electrode of transistor 206 to bring that transistor into conduction. Part of the current which would flow through transistor 42 is then bypassed by resistor 200 and transistor 206 to ground, to lessen the rate and extent of charge deposition on capacitor 54. This causes the voltage applied to the base electrode of transistor 44 to rise at a slower rate, and with the values chosen, in a manner to match the slower incoming vertical sweep signal applied to terminal 46. Although not shown in the drawing, it will be understood that the apparatus in which the present invention is incorporated includes means to automatically sense the mode of operation of the storage tube, to apply the proper voltage level to input terminal 215 in accordance with the manner in which the storage device is then employed.

The described arrangement of FIG. 1 also provides the further advantage of affording protection in the case of low voltage power supply failure. In such instance, terminal 6 of the integrated device will be "floating", and will cause the potential applied to the cathode electrode of the imaging transducer to be at the substantially more positive level required to cut off the electron beam of the device. In this respect it will be appreciated that the cathode amplifier 110 operates at a higher voltage level than that afforded by the low voltage supply and thus can be insensitive to its failures.

While applicant does not wish to be limited to any particular set of values, the below listed components have proved useful in the embodiments of the invention described herein:

| Component | Value |
|---|---|
| Resistor 18 | 1 kilohm |
| Resistor 20 | 33 kilohms |
| Resistor 22 | 10 kilohms |
| Resistor 24 | 10 kilohms |
| Resistor 26 | 15 kilohms |
| Resistor 30 | 130 kilohms |
| Resistor 50 | 1 kilohm |
| Resistor 52 | 10 kilohms |
| Resistor 56 | 51 kilohms |
| Resistor 58 | 10 kilohms |
| Resistor 60 | 4.7 kilohms |
| Resistor 62 | 33 kilohms |
| Resistor 72 | 5.1 kilohms |
| Resistor 200 | 33 kilohms |
| Resistor 202 | 5.1 kilohms |
| Resistor 204 | 2 kilohms |
| Capacitor 16 | 620 micromicrofarads |
| Capacitor 28 | 0.022 microfarads |
| Capacitor 48 | 0.015 microfarads |
| Capacitor 54 | 2.2 microfarads |
| Transistor 12 | RCA 3601 Type |
| Transistor 14 | RCA 3601 Type |
| Transistor 40 | RCA 3601 Type |
| Transistor 42 | RCA 3620 Type |
| Transistor 44 | RCA 3601 Type |
| Transistor 206 | RCA 3601 Type |
| Rectifier 208 | G121B2 |
| Rectifier 210 | G121B2 |
| Potential Source $+V_1$ | +5 volts |
| Potential Source $-V_2$ | −15 volts |
| Potential Source $+V_3$ | +15 volts |

While there have been described what are considered to be preferred embodiments of the present invention, it will be readily apparent to those skilled in the art that other modifications may be made without departing from the scope of the teachings herein. It is therefore contemplated that the invention be read in light of the claims appended hereto.

What is claimed is:

1. In combination with an imaging transducer of the type having an electron beam which is scanned across the face of a target thereof under direction of an applied horizontal deflection rate signal and under direction of an applied vertical deflection signal switchable between different scanning rates, a protection circuit comprising:

first means for sensing the absence of said applied horixontal deflection rate signal and for "blanking off" the electron beam of said imaging transducer in response thereto:

second means for sensing the absence of said applied vertical deflection rate signal and for alsO "blanking off" said electron beam as a response;

said first and second means each including a control device which is normally maintained in a first state of conduction by the presence of its associated deflection rate signal but which is rendered to a second state of conduction by the absence of its said associated signal, with the state of conduction of said device at any one time being governed by the energy condition of a charge-discharge circuit further included in each of said first and second means;

third means interspersed between each of said first and second means and said imaging transducer for sensing the conductivity state of said control devices and for regulating the bias voltage applied to said transducer to "blank" or "unblank" its electron beam as a function thereof and fourth means responsive to the switching of said vertical deflection signal between different scanning rates to vary as a function of the then applied vertical deflection rate, the time for the associated charge-discharge circuit to reach that energy condition at which its control device is rendered to the second state of conduction in the absence of said vertical deflection signal.

2. The protection circuit of claim 1 wherein said control devices are normally non-conductive, but are rendered conductive in the absence of said deflection rate signals by an increase in energy condition of said charge-discharge circuit beyond a predetermined level.

3. The protection circuit of claim 2 wherein said control devices are transistors having an input electrode coupled to its associated charge-discharge circuit, a common electrode, and an output electrode at which voltage representations of the conductivity state thereof are developed in accordance with the energy condition of said charge-discharge circuit.

4. The protection circuit of claim 3 wherein the charge-discharge circuits included within said first and second means each include a capacitor charging to a potential source by means of an included resistor, but wherein the rate of charge for said first means circuit is substantially in excess of the rate of charge for said second means circuit.

5. In combination with an imaging transducer of the type having an electron beam which is scanned across the face of a target thereof under direction of applied horizontal and vertical deflection rate signals, a protection circuit comprising:

first means for sensing the absence of said applied horizontal deflection rate signal and for "blanking off" the electron beam of said imaging transducer in response thereto;

second means for sensing the absence of said applied vertical deflection rate signal and for also "blanking off" said electron beam as a response;

said first and second means each including a control device which is normally maintained in a first state of conduction by the presence of its associated deflection rate signal but which is rendered to a second state of conduction by the absence of its said associated signal, with the state of conduction of said device at any one time being governed by the energy condition of a charge-discharge circuit further included in each of said first and second means;

and third means interspersed between each of said first and second means and said imaging transducer for sensing the conductivity state of said control devices and for regulating the bias voltage of said transducer to "blank" or "unblank" its electron beam as a function thereof;

wherein said control devices are normally non-conductive, but are rendered conductive in the absence of said deflection rate signals by an increase in energy condition of said charge-discharge circuit beyond a predetermined level;

wherein said control devices are transistors having an input electrode coupled to its associated charge-discharge circuit, a common electrode, and an output electrode at which voltage representations of the conductivity state thereof are developed in accordance with the energy condition of said charge-discharge circuit;

wherein the charge-discharge circuits included within said first and second means each include a capacitor charging to a potential source by means of an included resistor, but wherein the rate of charge for said first means is substantially in excess of the rate of charge for said second means circuit;

wherein each of said charge-discharge circuits also includes a further normally non-conductive control device which iS rendered conductive by applied horizontal and vertical deflection signals to provide a discharge path for its associated capacitor before the charge thereon increases to the predetermined level at which the change in conductivity from said first state to said second state occurs.

6. The protection circuit of claim 5 wherein the charge-discharge circuits of said first and second means each include a time constant network which is selected to respond to the presence of applied horizontal and vertical deflection rate signals to render said further control devices conductive so as to provide a discharge path by which the energy condition of said capacitors can be reduced before said predetermined levels are reached in the "blanking" of said electron beam.

* * * * *